United States Patent
Schmidt et al.

(10) Patent No.: US 11,026,028 B2
(45) Date of Patent: Jun. 1, 2021

(54) AUDIO STREAMING SYSTEM COMPRISING AN AUDIO STREAMER AND AT LEAST ONE EAR WORN DEVICE

(71) Applicant: Widex A/S, Lynge (DK)

(72) Inventors: Morten Schmidt, Jyllinge (DK); Claus Svane Bjerregaard, Allerod (DK); Thomas Lindhardt Iversen, Hedehusene (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 16/410,019

(22) Filed: May 13, 2019

(65) Prior Publication Data

US 2019/0356993 A1 Nov. 21, 2019

Related U.S. Application Data

(60) Provisional application No. 62/672,332, filed on May 16, 2018.

(51) Int. Cl.
*H04R 25/00* (2006.01)

(52) U.S. Cl.
CPC ....... *H04R 25/554* (2013.01); *H04R 2225/51* (2013.01)

(58) Field of Classification Search
CPC ........... H04R 25/00; H04R 2225/55; H04R 2225/51; H04R 25/552; H04B 7/10; H04B 1/713; H04B 7/0667; H04B 2201/71346; H04N 5/64
USPC .......................................................... 700/94
See application file for complete search history.

(56) References Cited

U.S. PATENT DOCUMENTS

| 6,032,033 A | 2/2000 | Morris et al. |
| 2007/0044126 A1 | 2/2007 | Mitchell |
| 2009/0007185 A1 | 1/2009 | Nix et al. |
| 2009/0221234 A1 | 9/2009 | Pirzada et al. |
| 2011/0141892 A1 | 6/2011 | Gong et al. |
| 2012/0310394 A1 | 12/2012 | El-Hoiydi |

(Continued)

FOREIGN PATENT DOCUMENTS

| EP | 2498514 A1 | 9/2012 | |
| EP | 2779700 A1 | 9/2014 | |
| EP | 2942978 A1 * | 11/2015 | ........... H04B 7/0613 |

OTHER PUBLICATIONS

Communication dated Jul. 9, 2019, from the European Patent Office in counterpart European Application No. 19172714.8.

*Primary Examiner* — Melur Ramakrishnaiah
(74) *Attorney, Agent, or Firm* — Sughrue Mion, PLLC

(57) ABSTRACT

An audio streaming system including an audio streamer connected to an audio source, and at least one ear worn device. The audio streamer includes a first antenna with a first polarization, a second antenna with a second polarization, and a radio configured for transmitting a first audio stream signal (30) from the first antenna and a second audio stream signal (31) from the second antenna. The first audio stream signal (30) and the second audio stream signal (31) carry the same audio information and are shifted in time. At least one ear worn device is configured to receive the first audio stream signal (30) and the second audio stream signal (31), compare the signal strength of the first audio stream signal (30) and the second audio stream signal (31), and select either the first audio stream signal (30) and the second audio stream signal (31) as input for audio reception.

10 Claims, 4 Drawing Sheets

(56) References Cited

U.S. PATENT DOCUMENTS

| | | |
|---|---|---|
| 2015/0326984 A1 | 11/2015 | Haubrich et al. |
| 2016/0249356 A1 | 8/2016 | Pope |
| 2016/0286323 A1 | 9/2016 | Buehl |
| 2016/0337763 A1 | 11/2016 | Zhang et al. |
| 2018/0020298 A1* | 1/2018 | Courtois .............. H04R 25/554 |
| 2018/0234777 A1* | 8/2018 | Roeck ................... H04R 25/30 |

* cited by examiner

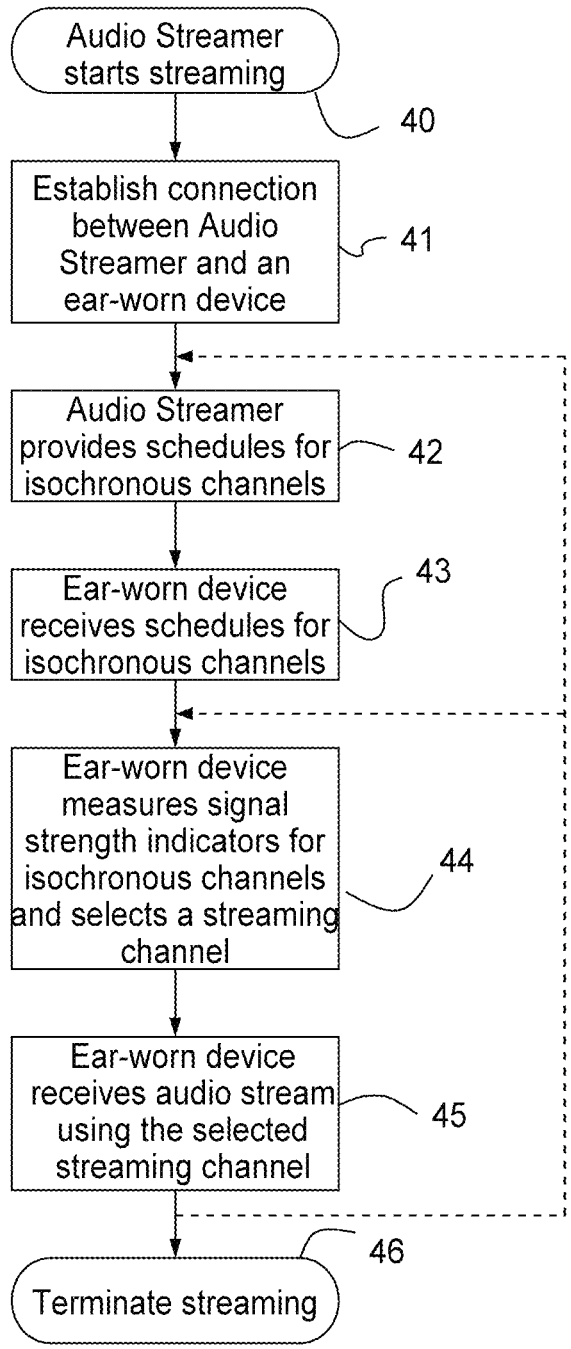
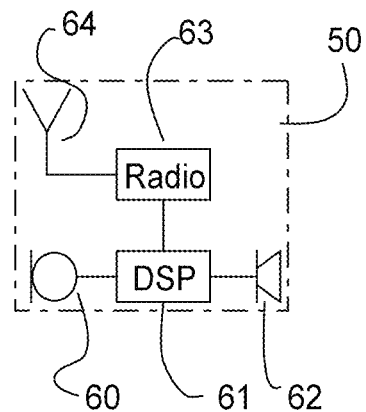
Fig. 6
Fig. 4

AUDIO STREAMING SYSTEM COMPRISING AN AUDIO STREAMER AND AT LEAST ONE EAR WORN DEVICE

BACKGROUND OF THE INVENTION

The present invention relates to an audio streaming system comprising an audio streamer connected to an audio source, and at least one ear worn device, such as a hearing aid. The invention, more particularly, relates to a method of streaming audio from a TV to one or more ear worn devices When sending data over a short-range data link, the transmission quality depends on the antennas used for the transmission. In case both antennas are linear polarized, the quality will depend angle φ the two linearly polarized antennas are rotated from each other. The power loss due to this polarization mismatch will be described by a Polarization Loss Factor PLF. If the two antennas are orthogonal, this will result in a severe mismatch with significant polarization loss.

Circular polarization is a desirable characteristic for many antennas. However, small antennas are often linearly polarized. By rotating a cell phone, the phone may often reduce the Polarization Loss Factor and thus increase reception. When a linearly polarized antenna is trying to receive a circularly polarized wave, the linearly polarized antenna will have a polarization mismatch loss of 3 dB, no matter what the angle the linearly polarized antenna is rotated to.

SUMMARY OF THE INVENTION

The purpose of the invention is to provide an audio streamer for use with at least one ear worn device, where the audio streaming is robust against how the at least one ear worn device is oriented.

This purpose is according to the invention achieved by a streamer for streaming audio from an audio source and comprising a first antenna (26) with a first polarization, a second antenna (27) with a second polarization, and a transmitter (25), wherein the transmitter (25) is adapted for transmitting a first audio stream signal (30) as an isochronous signal on the first antenna (26) and a second audio stream signal (31) as an isochronous signal on the second antenna (27), wherein the first audio stream signal (30) and the second audio stream signal (31) carry the same audio information and are shifted in time.

In a further aspect, the purpose of the invention is achieved by an audio streaming system comprising an audio streamer connected to an audio source, and at least one ear worn device (50), wherein the audio streamer comprises a first antenna (26) with a first polarization, a second antenna (27) with a second polarization, and a radio configured for transmitting a first audio stream signal (30) from the first antenna (26) and a second audio stream signal (31) from the second antenna (27), wherein the first audio stream signal (30) and the second audio stream signal (31) carry the same audio information in first and second time windows, respectively, wherein the at least one ear worn device (50) comprising: a radio (63) adapted for receiving the first audio stream signal and the second audio stream signal, a processor (61) being configured for: comparing the first audio stream signal (30) to a predefined criterion, and when the predefined criterion is fulfilled, choosing the first audio stream signal (30) as input for audio reception with the radio disabled in the second time window; or when the predefined criterion is not fulfilled, choosing the second audio stream signal (31) as input for audio reception.

In a yet further aspect, the invention resides in a method of receiving, in an ear worn device, an audio stream from an audio streamer transmitting a first audio stream signal from first antenna with a first polarization, a second audio stream signal from a second antenna with a second polarization, wherein the method comprises: receiving the first audio stream signal and the second audio stream signal, comparing the signal strength of the first audio stream signal to a predefined criterion, and choosing the first audio stream signal (30) as input for audio reception with the radio disabled in the second time window when the predefined criterion is fulfilled; or choosing the second audio stream signal (31) as input for audio reception when the predefined criterion is not fulfilled.

The invention is yet further directed to an ear worn device for receiving an audio stream from an audio streamer transmitting a first audio stream signal (30) having a first polarization and a second audio stream signal (31) having a second polarization, and comprising: a radio (63) for receiving the first audio stream signal and the second audio stream signal, a processor (61) being configured for: comparing the signal strength of the first audio stream signal (30) and the second audio stream signal (31), and choosing the first audio stream signal (30) as input for audio reception with the radio disabled in the second time window when the predefined criterion is fulfilled; or choosing the second audio stream signal (31) as input for audio reception when the predefined criterion is not fulfilled.

Still further, the invention comprises a streamer for streaming audio from an audio source and comprising a housing (10) and a mounting bracket (13) for mounting on a TV, the housing (10) having a first side with a first antenna (26) with a first polarization, and a second side with second antenna (27) with a second polarization, the housing (10) is provided a set of pins (12) along the first side and the second side, wherein the set of pins (12) are adapted to be slidably received along a pair of parallel rails (15) on the mounting bracket (13), and wherein the set of pins (12) are adapted to be releasably maintained by snap locking in an end position along the parallel rails (15) on the mounting bracket (13).

When using the audio streamer according to claim 13 as TV streamer, a TV solution for hearing impaired customers is provided where the audio streamer (audio transmitter box) may be mounted completely invisible behind a flat screen TV and thereby be completely hidden. The shape of the housing is basically triangular which invites the user to mount the audio transmitter box on the rear side of the TV in the top left or right corner. In one embodiment, the mounting bracket has a cable strap with adjustable strap clip. When the audio cables from the TV pass the eye of the cable strap, the audio cables are prevented from falling behind the TV when unplugged from the audio streamer. Furthermore, the mounting bracket and the cable strap acts a strain relief reducing the pull force exerted on the connectors attached to the housing of the audio streamer.

Further aspects of the invention will be apparent from the preferred embodiments as described below and in the claims hereafter.

BRIEF DESCRIPTION OF THE DRAWINGS

The invention will be described in further detail with reference to preferred aspects and the accompanying drawing, in which:

FIG. 4 illustrates a flow chart for the audio streaming method according to the invention, FIG. 6 illustrates an ear worn device according to one embodiment of the invention.

DETAILED DESCRIPTION

Figure 1:
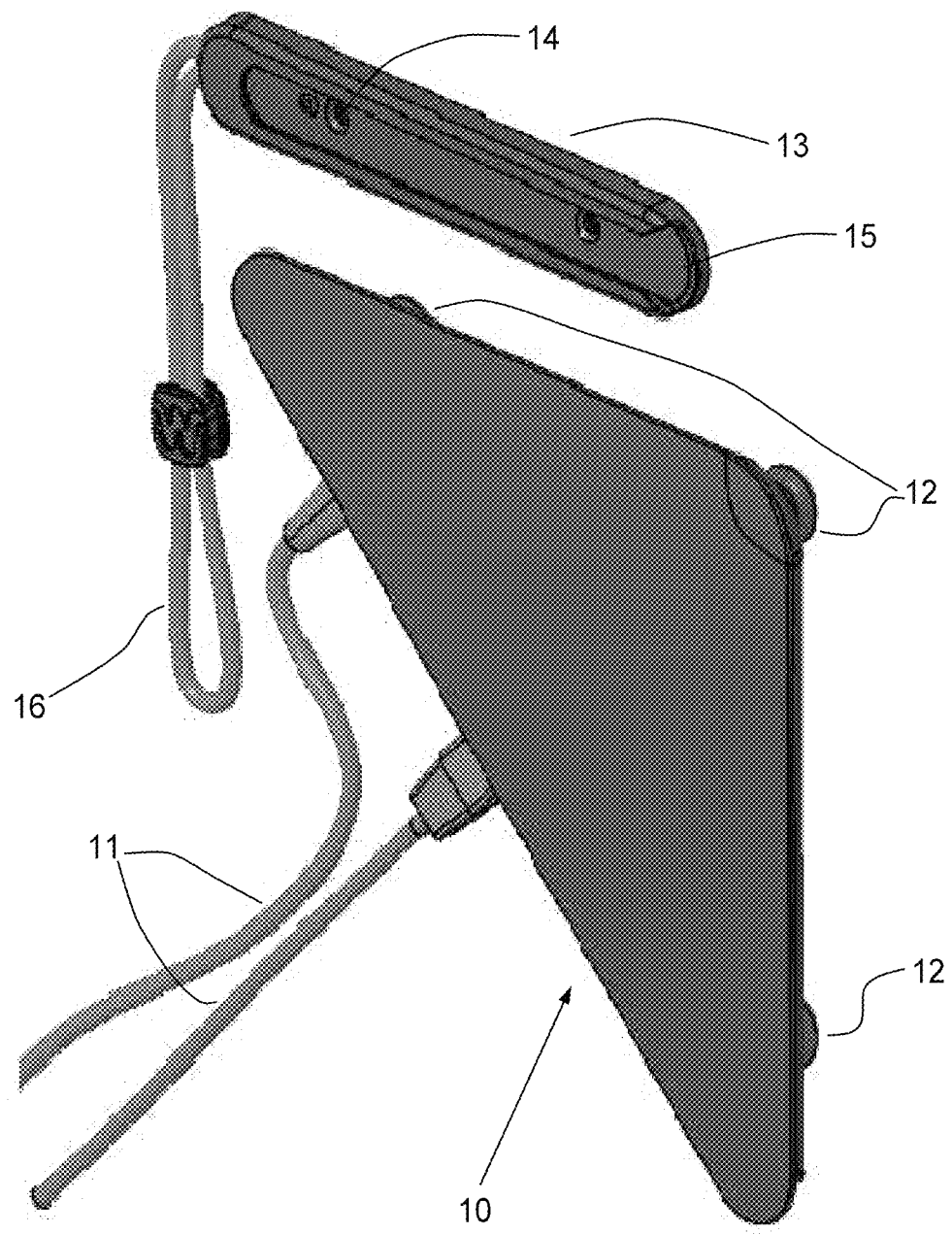
FIG. 1 illustrates an embodiment of an audio streamer according to the invention.

FIG. 1 shows an embodiment of an audio streamer according to the invention. The audio streamer illustrated provides according to one embodiment of the invention a TV solution for hearing impaired customers where the audio streamer (audio transmitter box) may be mounted completely invisible behind a flat screen TV and thereby be completely hidden. The audio streamer according to the invention has a housing 10. The shape of the housing 10 is basically triangular which invites the user to mount the audio transmitter box on the rear side of the TV in the top left or right corner.

Along on side, the housing 10 is provided with an array of sockets 21 (FIG. 2) for audio cables 11 from the TV. The sockets 21 may include HDMI, TOSLINK, USB and analog audio jack (3.5 mm standard audio jack or jack plug). TOSLINK is a standardized optical fiber connector system also known generically as an "optical audio cable".

The audio streamer is preferably mounted discretely on the back of the TV. The audio streamer has a dual antenna concept designed to provide the best possible wireless connection to all seats in front of the TV when the audio streamer is mounted on the rear side of the TV in one to the top corners. The shape of the audio streamer encourages the user to mount the device in the top corners for the best coverage.

The housing 10 is in one embodiment provided with three integrated T-shaped pins 12. These T-shaped pins 12 are adapted to slide along a pair of parallel rails 15 on a mounting bracket 13. The parallel rails 15 provides a recess configured to receive and guide the T-shaped pins 12 towards a predetermined position. The mounting bracket 13 has protrusions 14 in the bottom of the recess, the protrusions 14 are adapted for snap locking the T-shaped pins 13 having a depression in the top. The protrusions 14 are adapted for interacting with with the depression in the top of the T-shaped pins 13 when correctly positioned and the parts are maintained in correct position by snap locking until the assembly is separated by applying a sufficient force for separating. The mounting bracket 13 may be mounted horizontally as well as vertically, and the three T-shaped pins 12 on the housing 10 of the audio streamer supports both mounting directions.

The mounting bracket 13 is mounted on a TV by means of appropriate attachment means. These attachment means may comprise screws or double adhesive tape. In one embodiment, the double adhesive tape may be VHB™ double adhesive tape from the 3M Company as this tape provides a very strong bonding and as it can be removed without leaving marks on the TV cabinet.

The mounting bracket 13 has a cable strap 16 with adjustable strap clip. By letting the audio cables 11 from the TV pass the eye of the cable strap 16, the audio cables 11 are prevented from falling behind the TV when unplugged from the audio streamer. Furthermore, the mounting bracket 13 and the cable strap 16 acts a strain relief reducing the pull force exerted on the connectors attached to the housing 10 of the audio streamer. The adjustable loop size of the cable strap 16 can accommodate many different audio cables 11.

Figure 2:
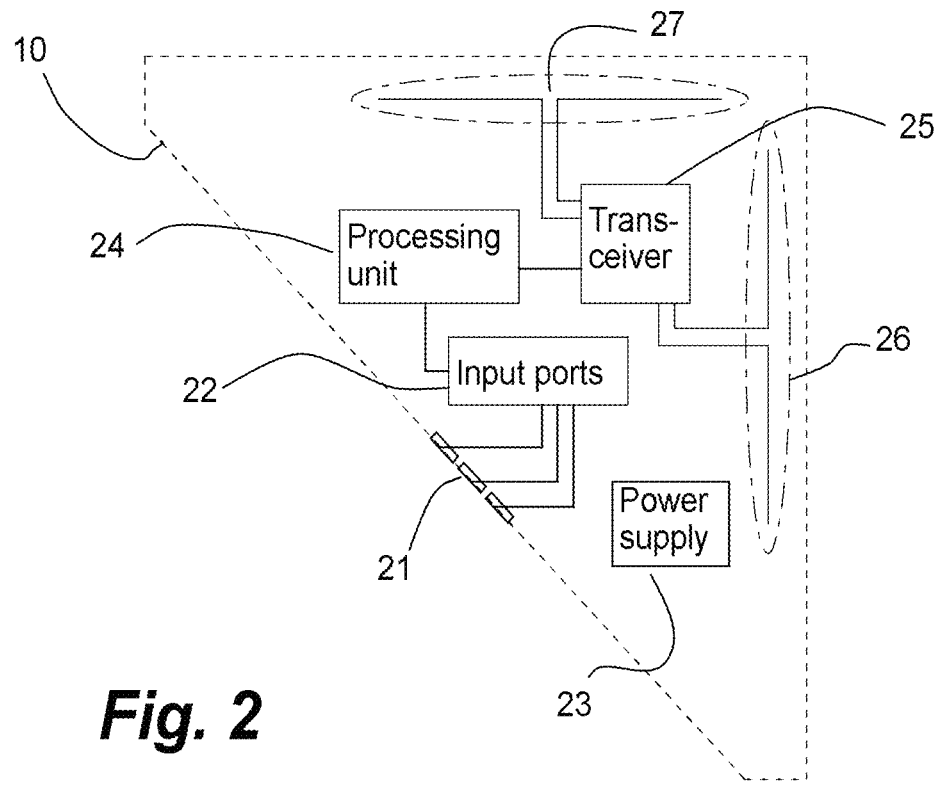
FIG. 2 illustrates schematically an embodiment of an audio streamer according to the invention.

FIG. 2 illustrates schematically an embodiment of an audio streamer according to the invention. The housing 10 has along on side facing away from the TV upper corner a plurality of sockets 21 for audio cables from TV. In one embodiment, the audio streamer is powered by directly from the TV using the USB interface, displacing extra power supply cables. A power supply 23 is distributing power from the TV among the power consuming elements of the audio streamer. The audio streamer will be connected to an USB port on the TV and will be powered on and off as a slave to the TV.

Audio received via the audio cables from the TV is via input ports 22 transferred to a processing unit 24. The processing unit 24 translates the audio input received from the TV into an output audio signal based on a protocol used when transmitting audio to the recipients. A transceiver 25 outputs the output audio signal via two antennas 26 and 27.

The actual design for the two antennas 26 and 27 may be based on dipole technology, PIFA antenna design, microstrip antenna design, or another appropriate antenna design.

The polarization of the antennas 26, 27 refers to the orientation of the electric field of the radio wave with respect to ground and the polarization is determined by the physical structure of the antenna and by its orientation. The optimum reception for a receiving antenna is obtained when matching the polarization of the transmitted wave. According to the invention the transmitter 25 transmits the audio stream via the first antenna 26 and the second antenna 27. The first antenna 26 has a first polarization, while the second antenna 27 has a second polarization. It is beneficial that the angle φ (FIG. 4) between the two antennas 26 and 27 is between 60 degrees and 120 degrees, or even more preferred that the angle φ is between 75 degrees and 105 degrees. According to one embodiment of the invention, the two polarizations are linear and substantially orthogonal. According to one embodiment of the invention, the transmitter 25 is a short-range radio having a signaling speed and range corresponding to a Bluetooth™ radio.

The transmitter 25 is adapted for outputting the audio signal as two isochronous signals via the two antennas 26 and 27. Hereby the data packets are sent alternating and shifted in time so the transceiver 25 does not have to transmit data packets for the two isochronous signals simultaneously. The protocol used for audio streaming is in one embodiment a proprietary standard in the ISM band from 2.4 to 2.485 GHz.

In one embodiment, the audio streamer operates in a broadcast mode, where it streams two identical and isochronous data packet trains carrying the same audio information but are slightly shifted in time in order to avoid collision in the transceiver 25.

In one embodiment, the audio streamer and the ear-worn devices, e.g. the hearing aids 50-53, may be paired in pairing process, e.g. like the BLE pairing process. The pairing process may include a proximity pairing process, where the arrangement of the devices next to each other, e.g. less than 50 cm, authenticates the thereby established link. The details exchanged during the pair process is used for subsequently reconnection when audio streaming is available. During the pairing the communication between the audio streamer 10 and the ear-worn devices is two-way communication, while the audio streaming is based upon broadcasting (one-way communication without acknowledgement). This makes the streaming set-up scalable with a possibility to serve multiple sets of ear-worn devices 50-53 (FIG. 4).

The transceiver 25 comprises a matching network, timing management and a RX/TX switch. The transceiver 25 comprises a modulator/demodulator block for applying modulation to the transmitted signal and demodulation to the received signal. In one embodiment, the radio signals are GFSK modulated (Gaussian Frequency Shift Keying). In one embodiment, the transceiver 25 comprises a frequency recovery block for synchronization the communicating units. In one embodiment, the transceiver 25 comprises a Power Amplifier (PA) increasing the RF output power and a Low Noise Amplifier (LNA) increasing the receiver sensitivity.

In one embodiment, the transceiver 25 uses a frequency-hopping spread spectrum (FHSS) scheme. In FHSS the transmitted radio signals by rapidly switches carrier among many frequency channels, using a pseudorandom sequence known by the transmitter and by the receiver. Interference at a specific frequency will only affect the signal during that short interval. Hereby, one-way communication without acknowledgement may be obtained. Two-way communication with acknowledgement is only used during the pairing process. In some embodiments, the transceiver 25 is triggered to send an updated pseudorandom sequence for the FHSS scheme. The trigger may be the user is notifying the audio streamer to apply a new sequence, e.g. via a push button on the housing 10 or via an instruction sent via a home network.

Figure 3:
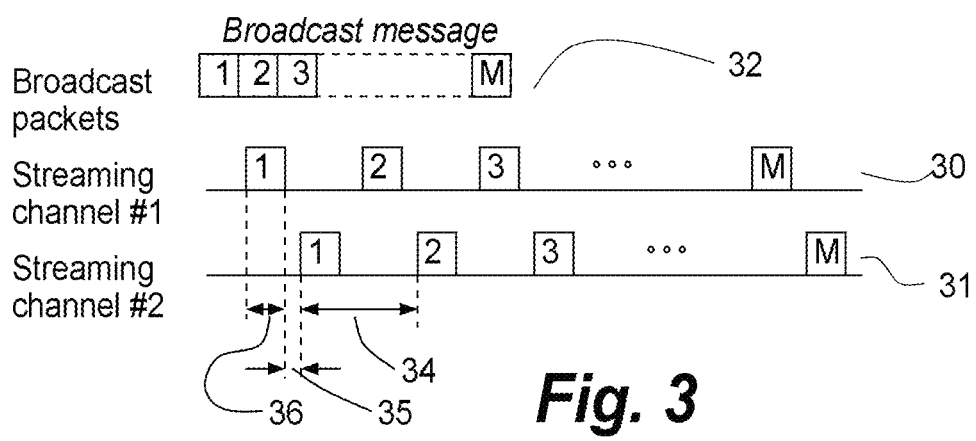
FIG. 3 illustrates how the audio streamer according to the invention transform a broadcast message into two isochronous streaming channels.

FIG. 3 illustrates how the audio streamer according to the invention transforms a broadcast message 32 consisting of a plurality of broadcast packets, 1-M, into a first isochronous streaming channel 30 and a second isochronous streaming channel 31. A first audio packet 1 is sent over the first streaming channel 30 and shortly after the first audio packet 1 is sent over the second streaming channel 31. The successive transmission of packets in the two isochronous streaming channels 30, 31 continues until the entire broadcast message 32 has been broadcasted.

In the embodiment illustrated in FIG. 3, the audio signal broadcasted as packets is a mono-signal. However, if the audio streamer broadcasts a stereo signal, each of the plurality of broadcast packets, 1-M, is divided into a broadcast packet targeted for the right ear-worn device 50 and a broadcast packet targeted for the left ear-worn device 51. Then right ear-worn device 50 are using the FHSS scheme with the pseudorandom hopping sequence for listening for broadcast packets targeted intended for right ear-worn devices and are otherwise in a sleep mode. The same applies for the left ear-worn device 51 listening for broadcast packets targeted intended for left ear-worn devices.

Isochronous data means information in a stream where each information entity in the stream is bound by a time relationship to previous and successive entities. "Isochronous" is a characteristic of one signal, while "synchronous" indicates a relationship between two or more signals. An isochronous signal is one where a time interval separating any two corresponding transitions is equal to a unit interval or to a multiple of the unit interval.

The unit interval is marked as an interval 34 from one packet start to the start of a subsequent packet. The reference number 36 refers to the duration of a packet, and the reference number 35 refers to the slip between two identical packets sent in the two isochronous streaming channels 30, 31. The slip 35 shall be kept as low as possible in order to keep the latency of the audio signal as low as possible, but sufficiently large to avoid collisions in the transceiver 25.

The signal broadcasted in first isochronous streaming channel 30 is similar to the signal broadcasted in the second isochronous streaming channel 31, but the signal broadcasted in the second isochronous streaming channel 31 is delayed avoiding collisions in the transceiver 25 and polarized substantially orthogonal relatively to the signal broadcasted in first isochronous streaming channel 30.

The audio streamer broadcasts data packets in which the audio signal is streamed as payload. Additionally, the audio streamer may broadcast advertisement packets and synchronization packets on a regular basis, e.g. ones per second or even more frequent. The advertisement packet identifies the Broadcasting device and the broadcasting channel, e.g. by means of a connection or channel identifier. The receiving device uses the connection or channel identifier for calculating the pseudorandom sequence. The synchronization packets are used for synchronizing the left and right ear worn devices 50, 51.

The data packets have a preamble, an ID data block identifying the connection or channel, and an audio payload data block. The payload data block comprises an error-detecting code, e.g. CRC (cyclic redundancy check) to detect accidental changes to raw data. When the receiving ear-worn devices or hearing aids 50-53 detects errors in the reception of the broadcasted data packets it instantly starts listening for the same date packet broadcasted with orthogonal polarization from the second antenna 27.

When the receiving ear-worn device or hearing aid 50 receives data packets successfully via the first isochronous streaming channel 30, its radio 63 enters a sleep mode and wakes up just before the next broadcasted data packet is scheduled to arrive via the first isochronous streaming channel 30. Hence, to save power, the radio 63 neglects data packets from the second isochronous streaming channel 31 when the reception of the data packets from the first isochronous streaming channel 30 is successful.

In one embodiment, the two isochronous streaming channels 30, 31 are endless, i.e. the pseudorandom sequence in the FHSS scheme ensures that the receiving device 50-53 will be able predict frequency hopping and timing for preferred one of the received isochronous streaming channels 30, 31 from the TV is switched on until the TV is switched off again.

In one embodiment, the pseudorandom sequence in the FHSS scheme ensures that the receiving device 50-53 will be able predict frequency hopping and timing for a finite period, where after the audio streamer advertises a new FHSS scheme with a new pseudorandom hopping sequence for the isochronous streaming channels 30, 31. Prior to the advertising of a new FHSS scheme with a new pseudorandom hopping sequence, the receiving device 50-53 will have an opportunity feed issues with signal strengths in various frequency bands, fading etc. back to the audio streamer, whereby the audio streamer may take the feed back into account when defining the new FHSS scheme with the new pseudorandom hopping sequence.

In one embodiment, receiving device 50-53 receives both the two isochronous streaming channels 30, 31 from the audio streamer, and uses the redundant information of error correction when needed.

FIG. 4 illustrates a flow chart for the audio streaming method according to the invention. When the audio streamer is connected to an USB port on the TV, the audio streamer will in step 40 be powered on when the TV is powered on. Any paired ear-worn device will in step 41 re-connect to the audio streamer, either automatically or after an instruction manually entered by user of the ear-worn device. The ear-worn device may be one of the hearing aids 50-53. The audio streamer advertises periodically in step 42 a new FHSS scheme with a new pseudorandom hopping sequence for the isochronous streaming channels 30, 31.

Once the ear-worn device receives the FHSS scheme with the pseudorandom hopping sequence in step 43, the ear-worn device 50 measures signal strength indicators for the two isochronous channels 30, 31 and selects in step 44 the streaming channel providing the best results for an appropriate indicator for the broadcasted signal, e.g. the signal strength, or the best Signal-to-Noise-Ratio. After the selection of the preferred isochronous channels 30,31, the ear-worn device receives in step 45 the broadcasted audio stream by using the selected and preferred isochronous channel. The audio streaming is continued until the audio streamer is switched off in step 46.

In one embodiment, the audio streaming is continued until the audio streamer advertises a new FHSS scheme with a new pseudorandom hopping sequence for the isochronous streaming channels 30, 31. The planned, periodic advertisement of an updated FHSS scheme with an updated pseudorandom hopping sequence is an optional feature (marked with dotted line back to step 42 in FIG. 4) according to the invention.

In one embodiment, the ear worn device 50 measures signal strength indicators for the two isochronous channels 30, 31 and selects in step 44 the streaming channel providing the best results for an appropriate indicator for the broadcasted signal. In this embodiment, the indicator is measured periodically and the selection of the streaming channel providing the best indicator result is valid until the next selection is made based on the next indicator results. The selection of the streaming channel may be valid for a plurality of audio packets, and this is marked with dotted line back to step 44 in FIG. 4.

Figure 5:
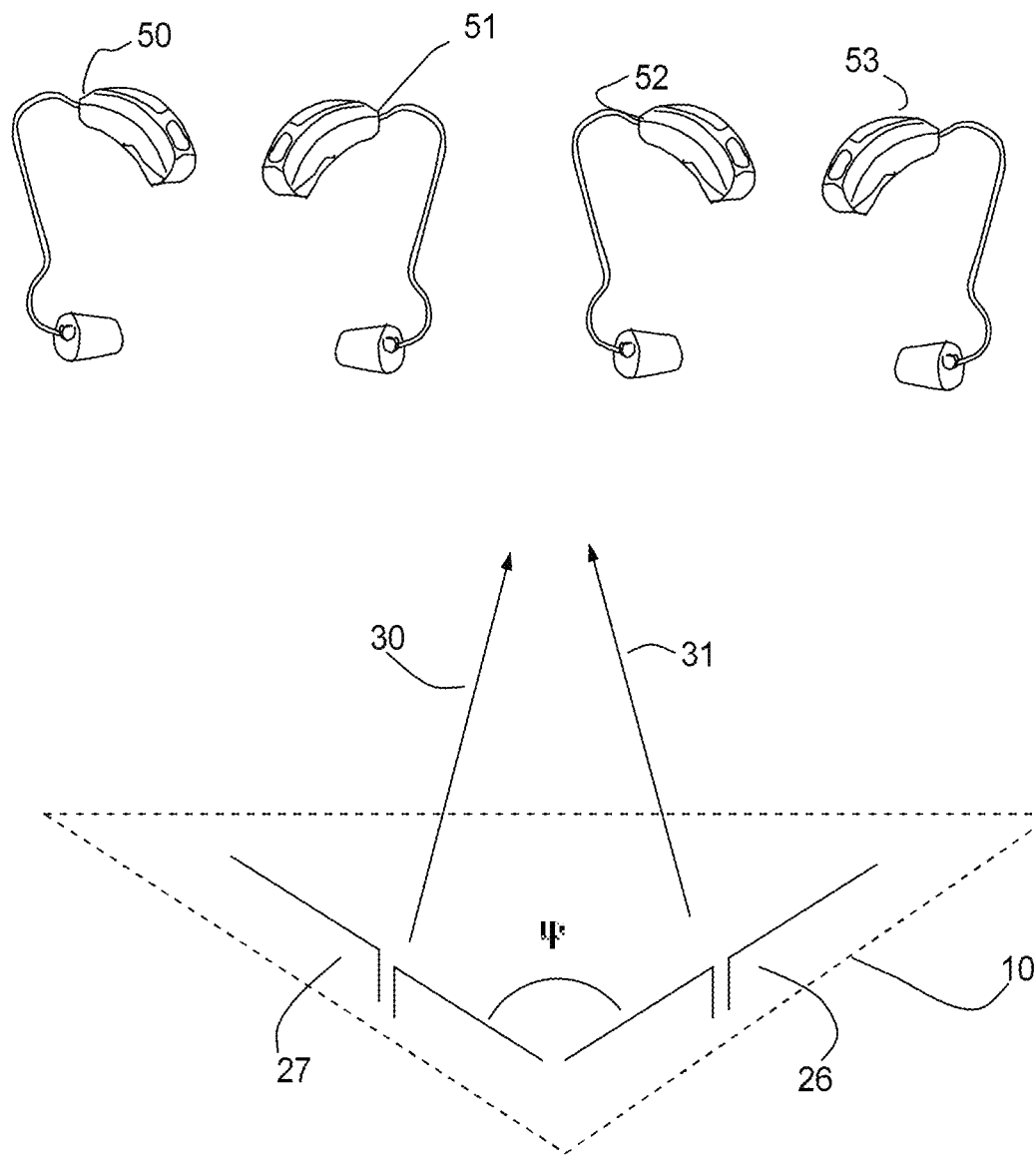
FIG. 5 illustrates a scenario where the audio streamer according to the invention streams audio to several recipients.

FIG. 5 illustrates a scenario where the audio streamer according to the invention streams audio to several recipients, e.g. ear-worn devices or hearing aids 50-53. The two antennas 26, 27 with different polarization outputs the two isochronous streaming channels 30, 31. The angle φ between the two antennas 26, 27 and thereby the polarization of the electric fields emitted the antennas 26, 27 will be approximate 90 degrees.

The two isochronous streaming channels 30, 31 can be received by any recipient within a range of 10-20 meters as the transmitter 25 is a short-range radio. This makes the audio streamer very useful as a TV streamer were 1-2 persons are present in front of the TV in a living room;
a school system were some students are present in a class room and receives audio streamed from a speaker's microphone; or
a cinema streamer where an unknown number of hearing impaired persons received audio streamed from the audio track of the watched movie.

The ear worn device 50 according to the invention is in one embodiment a hearing aid as shown in FIG. 6. The hearing aid has one or more acoustical-electrical input transducer 60 for picking up the acoustic sound. The analog audio signals from the input transducer 60 is pre-amplified and converted into digital signals feed to a processor 61. The processor 61 is in the illustrated embodiment a processor designed for amplifying and conditioning of the audio signal intended to become presented for the hearing aid user. The amplification and conditioning carried out according to a predetermined setting to alleviate a hearing loss by amplifying sound at frequencies in those parts of the audible frequency range where the user suffers a hearing deficit. The processor 61 outputs the processed audio signal via a receiver 62 (low power speaker).

The ear worn device 50 an antenna 64 connected to a transceiver or a radio 63. The ear worn device 50 is hereby configured for communication with other devices via a short-range communication link for exchanging data over short distances (typically less than 10 m), operating in the same spectrum range (2402-2480 MHz) as e.g. Classic Bluetooth technology.

The ear worn device 50 is configured to receive the two audio stream signals by means of the radio 63 and the antenna 64. In one embodiment, the radio 63 calculates the received signal strength indicator (RSSI) as a measurement of the power present in the two received radio signals provided by the first audio stream signal 30 and the second audio stream signal 31. The processor 61 is adapted to compare the measured signal strengths for the two received radio signals, and to choose one of the two received radio signals in response to the comparison as input for reception of the audio stream. In one embodiment, the ear worn device 50 disregard from the other, not-chosen received radio signal.

It should be noted that the above description of preferred embodiments is merely an example, and that the skilled person would know that numerous variations are possible without departing from the scope of the claims.

The invention claimed is:

1. An audio streaming system comprising an audio streamer connected to an audio source, and at least one ear worn device (50),
    wherein the audio streamer comprises
        a first antenna (26) with a first polarization,
        a second antenna (27) with a second polarization, and
        a radio configured for transmitting
            a first audio stream signal (30) from the first antenna (26) and
            a second audio stream signal (31) from the second antenna (27),
    wherein the first audio stream signal (30) and the second audio stream signal (31) are isochronous signals and carry the same audio information in first and second time windows, respectively,
    wherein the at least one ear worn device (50) comprises:
        a radio (63) adapted for receiving the first audio stream signal and the second audio stream signal,
        a processor (61) being configured for:
            comparing the first audio stream signal (30) to a predefined criterion, and
            in response to the predefined criterion being fulfilled, choosing the first audio stream signal (30) as input for audio reception with the radio disabled in the second time window; or
            in response to the predefined criterion not being fulfilled, choosing the second audio stream signal (31) as input for audio reception.

2. The audio streaming system according to claim 1 wherein the at least one ear worn device (50) comprises a hearing aid.

3. The audio streaming system according to claim 1, wherein the isochronous signals are associated with a time unit interval, and wherein any significant instants by the isochronous signals are separated in time by the time unit interval a multiple thereof.

4. A method of receiving an audio stream, in an ear worn device of an audio streaming system according to claim 1, wherein the method comprises:
- receiving the first audio stream signal and the second audio stream signal,
- comparing the signal strength of the first audio stream signal to said predefined criterion, and
- choosing the first audio stream signal (30) as input for audio reception with the radio disabled in the second time window in response to the predefined criterion being fulfilled; or
- choosing the second audio stream signal (31) as input for audio reception in response to the predefined criterion not being fulfilled.

5. An ear worn device for receiving an audio stream from an audio streamer in an audio streaming system according to claim 1, comprising:
- said radio (63) for receiving the first audio stream signal and the second audio stream signal,
- said processor (61) configured for:
  - comparing the first audio stream signal (30) to a predefined criterion, and
  - choosing the first audio stream signal (30) as input for audio reception with the radio disabled in the second time window in response to the predefined criterion being fulfilled; or
  - choosing the second audio stream signal (31) as input for audio reception in response to the predefined criterion being not fulfilled.

6. An audio streaming system comprising an audio streamer connected to an audio source, and at least one ear worn device (50),
wherein the audio streamer comprises
- a first antenna (26) with a first polarization,
- a second antenna (27) with a second polarization, and
- a radio configured for transmitting
  - a first audio stream signal (30) from the first antenna (26) and
  - a second audio stream signal (31) from the second antenna (27),
  - wherein the audio streamer is configured to advertise a signaling scheme comprising timing and frequency hopping plans for the first audio stream signal (30) and the second audio stream signal (31),
wherein the first audio stream signal (30) and the second audio stream signal (31) carry the same audio information in first and second time windows, respectively,
wherein the at least one ear worn device (50) comprises:
- a radio (63) adapted for receiving the first audio stream signal and the second audio stream signal,
- a processor (61) being configured for:
  - comparing the first audio stream signal (30) to a predefined criterion, and
  - in response to the predefined criterion being fulfilled, choosing the first audio stream signal (30) as input for audio reception with the radio disabled in the second time window; or
  - in response to the predefined criterion not being fulfilled, choosing the second audio stream signal (31) as input for audio reception.

7. The audio streaming system according to claim 6, wherein the audio streamer is configured to periodically update the advertised signaling scheme.

8. An audio streaming system comprising an audio streamer connected to an audio source, and at least one ear worn device (50),
wherein the audio streamer comprises
- a first antenna (26) with a first polarization,
- a second antenna (27) with a second polarization, and
- a radio configured for transmitting
  - a first audio stream signal (30) from the first antenna (26) and
  - a second audio stream signal (31) from the second antenna (27),
  - wherein the first audio stream signal (30) and the second audio stream signal (31) carry the same audio information in first and second time windows, respectively,
where said audio streamer comprises a housing (10) and a mounting bracket (13) for mounting on a TV, the housing (10) having a first side with said first antenna (26) and a second side with said second antenna (27), the housing (10) is provided a set of pins (12) along the first side and the second side,
  - wherein the set of pins (12) are adapted to be slidably received along a pair of parallel rails (15) on the mounting bracket (13), and
  - wherein the set of pins (12) are adapted to be releasably maintained by snap locking in an end position along the parallel rails (15) on the mounting bracket (13),
wherein the at least one ear worn device (50) comprises:
- a radio (63) adapted for receiving the first audio stream signal and the second audio stream signal,
- a processor (61) being configured for:
  - comparing the first audio stream signal (30) to a predefined criterion, and
  - in response to the predefined criterion being fulfilled, choosing the first audio stream signal (30) as input for audio reception with the radio disabled in the second time window; or
  - in response to the predefined criterion not being fulfilled, choosing the second audio stream signal (31) as input for audio reception.

9. The streamer according to claim 8, wherein the housing (10) has a third side carrying an array of sockets (21) for audio cables (11) from the TV.

10. The streamer according to claim 9, wherein the mounting bracket (13) comprises a cable strap (16) with adjustable strap clip for holding the audio cables (11).

* * * * *